Figure 33:
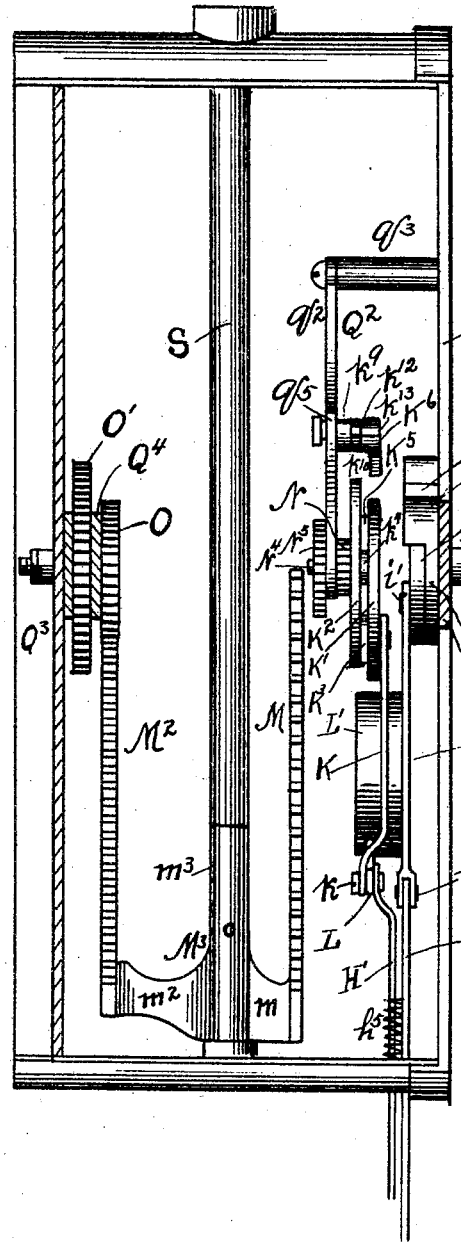

No. 771,013. PATENTED SEPT. 27, 1904.
W. F. HERDRICH.
AUTOMATIC STEAM COOKER.
APPLICATION FILED JUNE 28, 1902.
NO MODEL. 7 SHEETS—SHEET 1.
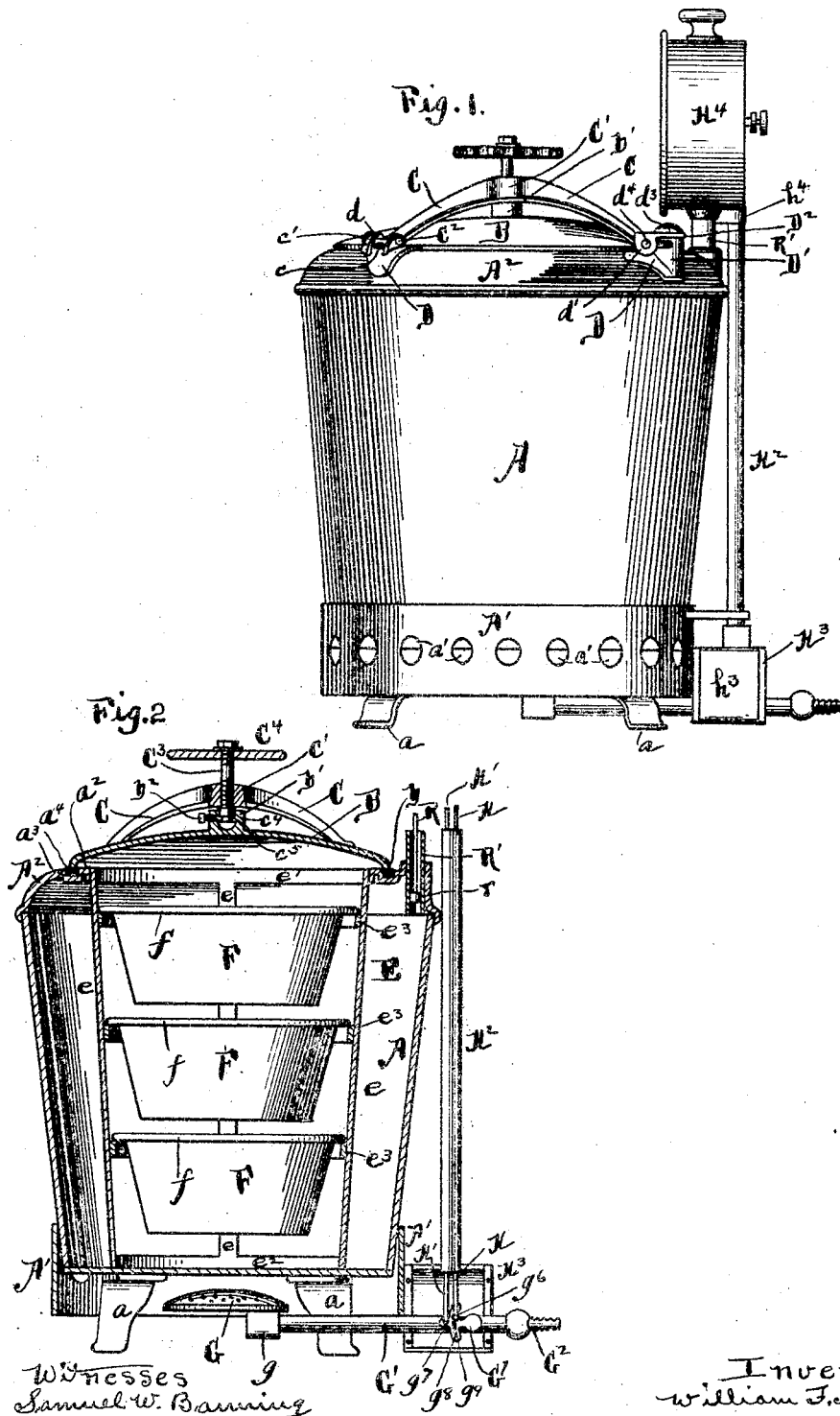

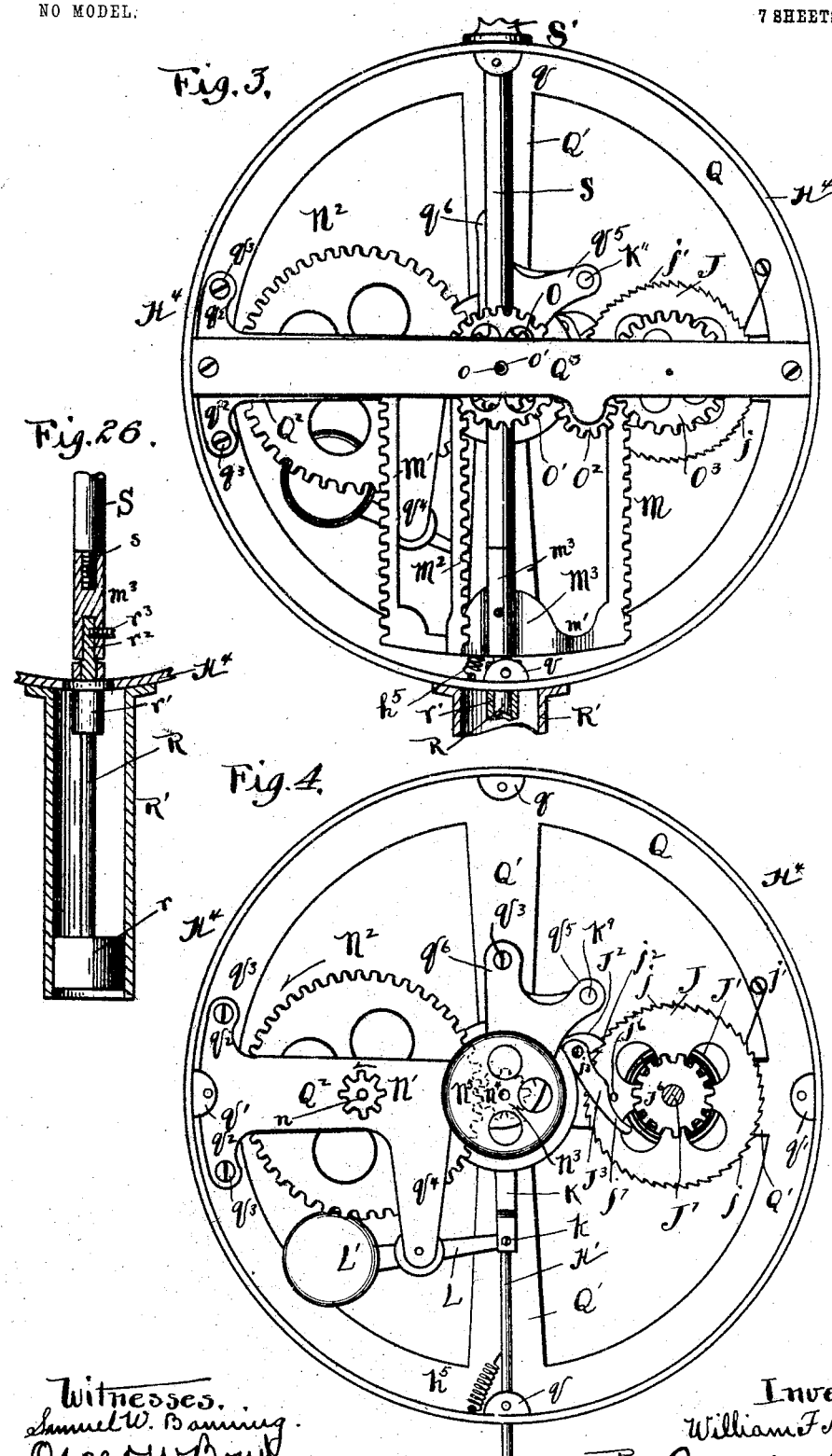

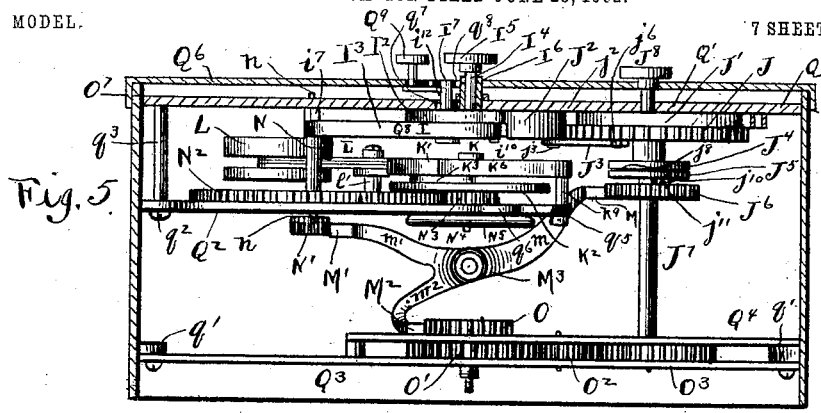
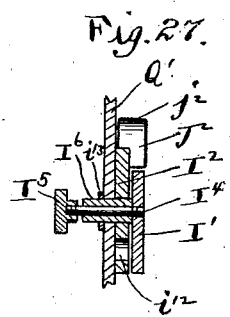
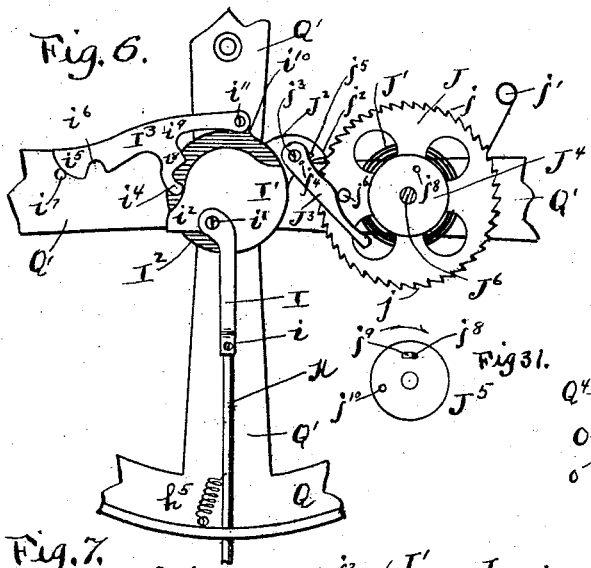
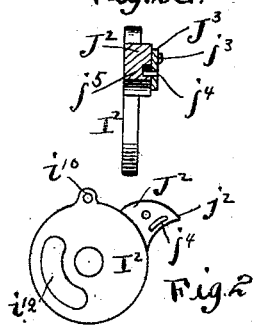
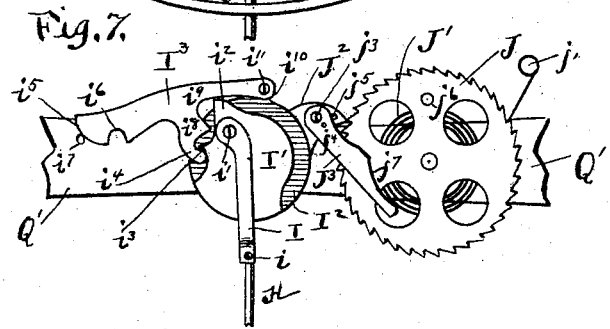

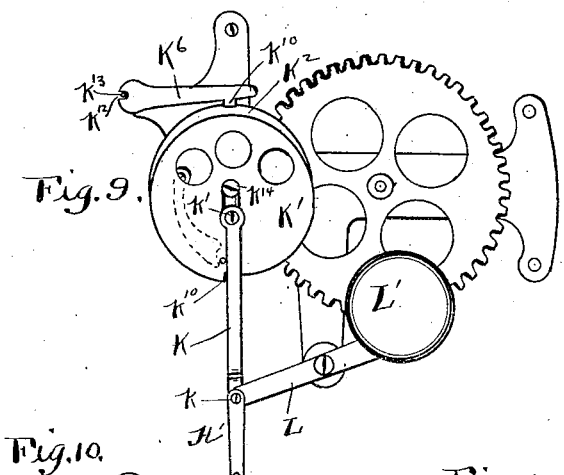
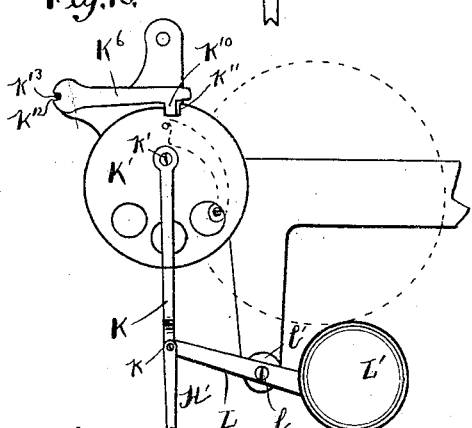
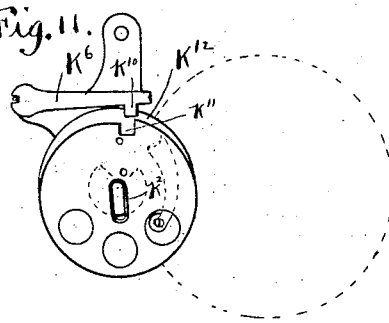
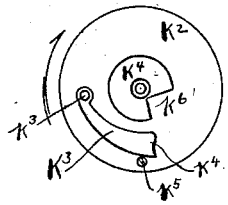
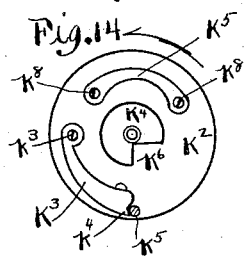
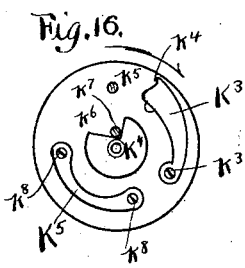
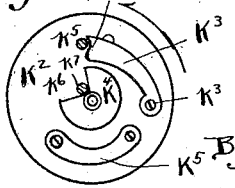

No. 771,013. PATENTED SEPT. 27, 1904.
W. F. HERDRICH.
AUTOMATIC STEAM COOKER.
APPLICATION FILED JUNE 28, 1902.
NO MODEL. 7 SHEETS—SHEET 5.
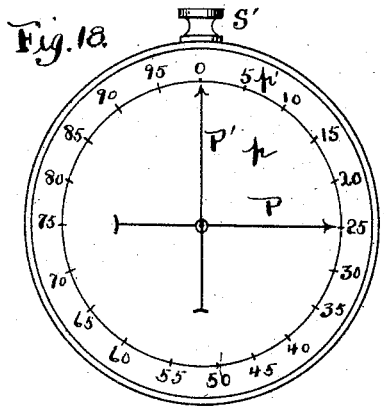
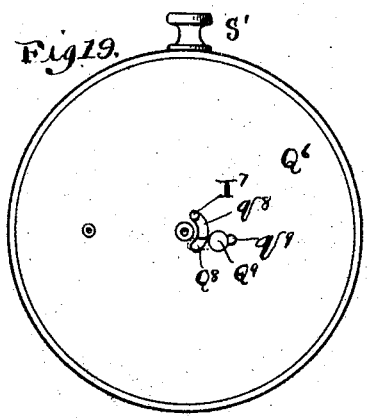
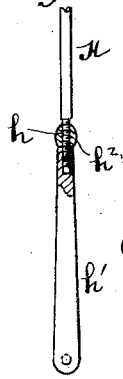
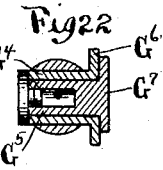
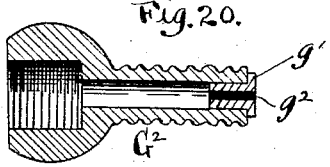
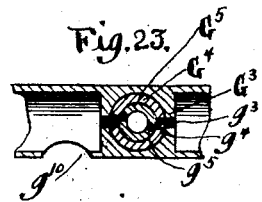
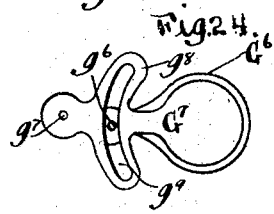
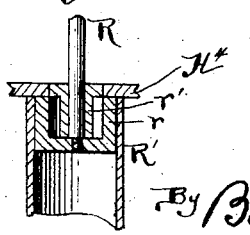
Witnesses.
Samuel W. Banning
Oscar W. Bond
Inventor
William F. Herdrich
By Banning & Banning,
Attys.

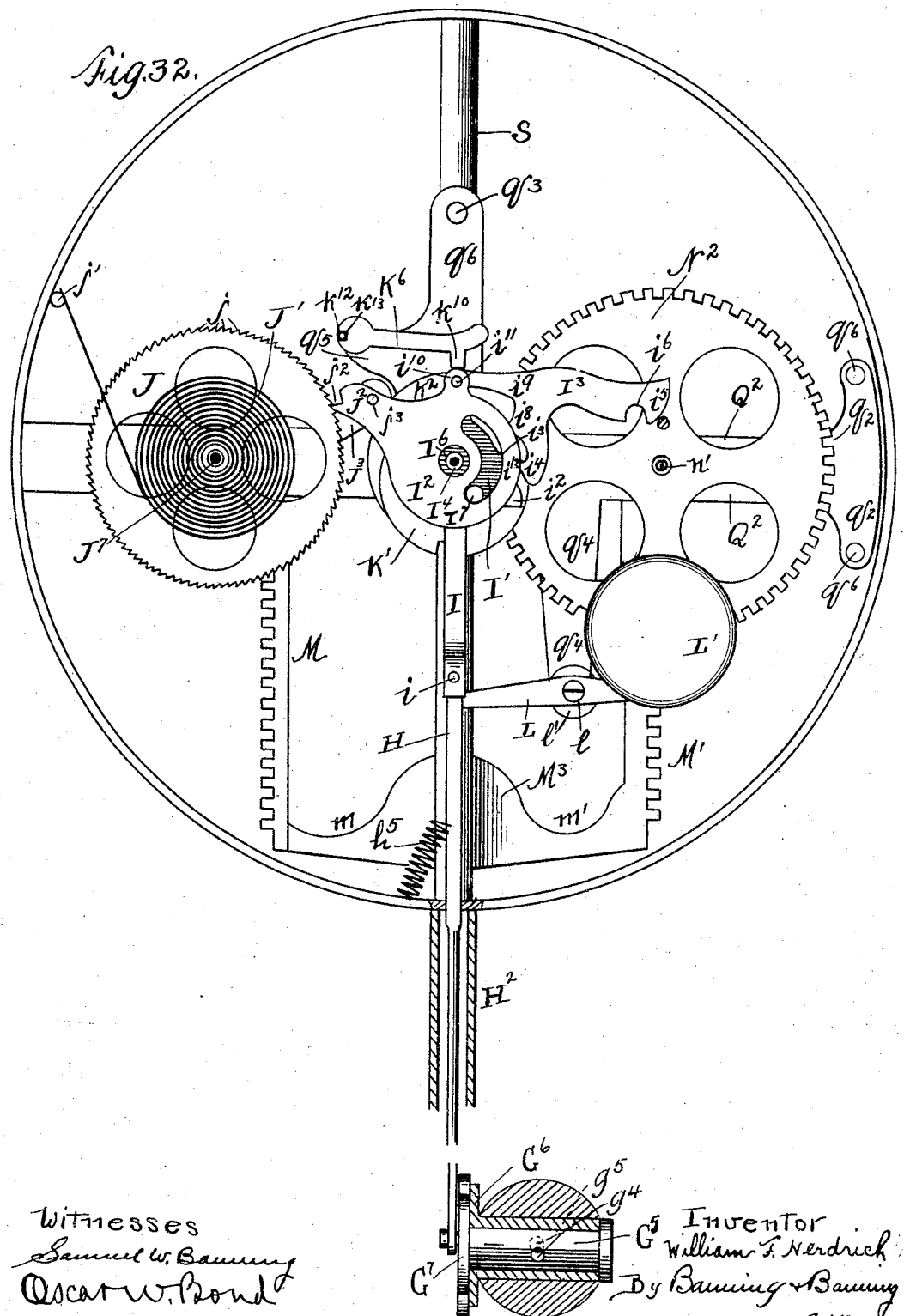

No. 771,013. PATENTED SEPT. 27, 1904.
W. F. HERDRICH.
AUTOMATIC STEAM COOKER.
APPLICATION FILED JUNE 28, 1902.

NO MODEL. 7 SHEETS—SHEET 7.

Witnesses
Samuel W. Banning
Oscar W. Bond

Inventor
William F. Herdrich
By Banning & Banning
Attys

No. 771,013. Patented September 27, 1904.

UNITED STATES PATENT OFFICE.

WILLIAM F. HERDRICH, OF CHICAGO, ILLINOIS, ASSIGNOR OF ONE-HALF TO ELZEARD GEOFFROY HETU, OF CHICAGO, ILLINOIS.

AUTOMATIC STEAM-COOKER.

SPECIFICATION forming part of Letters Patent No. 771,013, dated September 27, 1904.

Application filed June 28, 1902. Serial No. 113,591. (No model.)

*To all whom it may concern:*

Be it known that I, WILLIAM F. HERDRICH, a citizen of the United States, residing at Chicago, in the county of Cook and State of Illinois, have invented certain new and useful Improvements in Automatic Steam-Cookers, of which the following is a specification.

This invention relates to steam-cookers in which the cooking operation is carried on under conditions by which at a predetermined point the heat will be automatically shut off and the production of steam stopped and in which during the time occupied in reaching the predetermined point of shut-off for the heat the steam will be held against rising above a given pressure and will be permitted to fall below the pressure-point as the heat is partially shut off and will be caused to rise to the pressure-point as the heat is increased and have such rising and falling of the pressure continue during the period of the cooking operation until the predetermined point of shut-off for the heat has been reached. The fuel used with the cooker is heat-producing gas or vapor, the supply of which is controlled so as to increase and decrease the heat, alternately increasing and reducing the steam-pressure within the cooking vessel, as required for attaining the end sought of a predetermined point at which the cooking operation shall cease.

The objects of the invention are to improve the devices controlling the supply of gas or vapor used for supplying the heat in respect to automatically actuating the devices to alternately reduce the supply and increase the supply of gas or vapor as required for the predetermined point of stopping the cooking operation; to enable the means controlling the supply of gas or vapor to operate and admit a full head of gas or vapor or a partial head of gas or vapor or to shut off entirely the supply of gas or vapor to the burner of the cooker; to operate the means controlling and regulating the supply of gas to the burner of the cooker by and through the pressure of the generated steam in the cooking vessel; to cause the pressure of the steam, when a governing-pressure is reached, to operate the controlling and regulating means for the gas or vapor supply, partially closing the supply as the governing-point of the pressure is reached and increasing the supply to again raise the pressure to the governing-point, each rise of the pressure to the governing-point operating the means controlling the gas or vapor supply to partially shut off the supply; to control the supply of gas or vapor to the burner by a two part or member valve, one part or member operating as a regulating-valve and the other part or member as a shut-off valve, and have the movements of the two parts or members of the valve actuated independently one of the other through means operative from the pressure of the steam within the cooking vessel; to enable the predetermined state of placement of the regulating mechanism to control the period during which the cooking operation will continue and when the predetermined state of placement has been reached have the regulating mechanism operate to shut off entirely the supply of gas or vapor, and to improve generally the construction and operation of the controlling mechanisms entering into the construction of the cooker as a whole.

The invention consists in the features of construction and combinations of parts hereinafter described and claimed.

Figure 34:
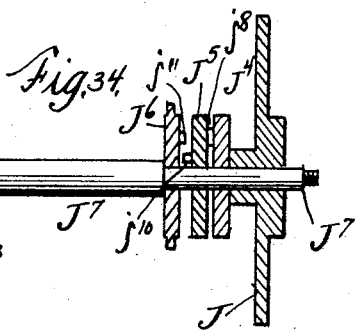

In the drawings, Figure 1 is a side elevation showing the cooking vessel of the invention and the appliances coacting for regulating and controlling the gas supplied thereto; Fig. 2, a sectional elevation of the outer vessel and its cover and the support for the cooking vessels or utensils with the cooking vessels or utensils in elevation and with a portion of the appliance or mechanism for controlling and regulating the gas removed; Fig. 3, a front elevation of the casing for the time-gage with the pointers and the face-plate removed and showing the mechanism carried by the casing for regulating and controlling the supply of gas; Fig. 4, a similar view to Fig. 3 with the front cross-bar and the rack and gear of the gas controlling and regulating mechanism removed; Fig. 5, a sectional plan view of the casing of the time-gage showing the mechanism for controlling and regulating the flow of gas to the burner; Fig. 6, a detail of the means for shutting off the flow of gas either partially or wholly, as may be required, and showing the parts in their normal position with the gas shut off; Fig. 7, a detail showing the mechanism of Fig. 6 as to the working parts thereof in an adjusted predetermined position and the gas turned on; Fig. 8, a detail of a portion of the mechanism shown in Fig. 6, showing the parts in position at the terminus of the predetermined period of time and with the gas shut off; Fig. 9, a detail of the mechanism for regulating the flow of gas, showing the parts in position with the gas on full head; Fig. 10, a similar view to Fig. 9, showing the parts in position for partially shutting off the gas; Fig. 11, a detail showing the position of the disks of the regulating mechanism when the gas is partially shut off and just before the movement of the disk opens the feed to increase the supply of gas; Fig. 12, a detail showing the inner face of the drop or regulating disk or plate of the supply-regulating mechanism; Fig. 13, a detail of the inner face of the companion and rotatable disk of the gas-regulating mechanism; Figs. 14, 15, 16, and 17, face views of the rotatable disk of Fig. 13, showing the various positions of the disk in the operation of the gas-regulating mechanism and showing in all of the figures the projecting pin for moving or partially turning the regulating or drop disk or plate; Fig. 18, a face view of the time-gage, showing the pointers with the setting pointer or hand at a predetermined point on the scale and the indicator hand or pointer at the starting-point or zero; Fig. 19, a rear face view of the time-gage, showing the stop for limiting the movement of the shut-off mechanism; Fig. 20, a detail in section of the coupling in one form of construction for attaching the gas-supply hose or tube; Fig. 21, a detail, partly in section, showing the construction of the valve rods or stems; Fig. 22, a detail in longitudinal section through the shutting-off and regulating valve; Fig. 23, a detail in cross-section of the parts shown in Fig. 22; Fig. 24, a detail showing an end elevation of the arms for the regulating and shutting-off valve; Fig. 25, a detail in section showing the construction of the piston and its cylinder by which, through the pressure of the steam, the mechanism of the regulating and shutting-off valve is operated to shut off the gas at a predetermined period of time; Fig. 26, a detail in section showing the piston and its cylinder and the connection of the piston-rod with the racks and weight-rod which actuate the mechanism of the regulating and shut-off valve; Fig. 27, a detail, partly in section, of the disks or plates and the dog of the valve shut-off mechanism; Fig. 28, a detail, partly in section, of the dog or pawl of the shut-off mechanism and the arm for forcing the dog or pawl from its released position to its engaged position; Fig. 29, a detail, being a face view of the disk and the dog or pawl thereon of the shut-off mechanism; Fig. 30 a detail in section of the gear and the arbor for the hands or pointers; and Fig. 31, a face view of one of the disks of the shut-off mechanism for compensating for lost motion arising from the space occupied by the contacting pins or lugs between the gear and one of the disks of the mechanism; Fig. 32, a rear face view with the closing-plate of the casing removed, showing the mechanism for actuating the controlling and regulating valve in position with the valve partially closed; Fig. 33, a side elevation, partly in section, of the elements pertaining to the valve controlling and regulating mechanism in the position shown in Fig. 33; and Fig. 34, a detail, partly in section, of the ratchet-disk and the controlling disks and gear on the shaft of the ratchet-disk.

The outer vessel A is mounted on legs $a$, supporting its bottom at a sufficient height for the location of a suitable burner thereunder, and its lower end is encircled by a band A', having air-holes $a'$ for supplying air to the burner. The top $A^2$ of the vessel has therein an opening for the insertion of the cooking vessels or receptacles and their support, and in the upper face of the top is a circumferential depression, in which is inserted a packing. The cover B has a circumferential depending edge or lip $b$ to fit closely and snugly against the packing of the top when the cover is forced down so as to make a steam-tight joint. The cover is carried and forced down by a spider consisting of arms C and a center or hub C'. All of the arms C except one have at their outer end an eye $c$, entered between ears $d$ on a plate D, attached to the top of the cover, and through the ears and the eye a locking-bolt $c'$ passes, uniting the spider to the top of the vessel. The plate D of one arm has an upwardly-extending stud D', on the top of which is mounted a plate $D^2$, held in place by a pivot-screw $D^3$, so as to allow the plate to swing on the pivot-screw. The plate $D^2$ has depending ears $d'$, between which is entered the eye $c$ of its arm of the spider, and extending through the ears and the eye is a pivot-pin $d^2$, which allows the spider and with it the cover to be raised vertically. A support E for holding the cooking vessels is entered into the interior of the outer vessel through the opening in the top, and this support, as shown, consists of a series of vertical bars $e$, set inwardly inclined from the top to the bottom, and an upper and lower ring $e'$ and $e^2$ and a series of intermediate rings $e^3$, located on the inside of the vertical bars and forming ridges or shoulders, on which the rims $f$ of the cooking vessels F rest when the cooking vessels are placed within the support, as shown in Fig. 2.

A burner G of any suitable construction for burning gas or vapor is located beneath the bottom of the outer vessel or receptacle and, as shown, has an inlet $g$, into which is entered the end of the supply-pipe $G'$, on the outer end of which pipe is a coupling-nipple $G^2$, adapted to have entered thereonto the end of the gas-supply hose or tube, for which purpose the exterior of the stem of the coupling is corrugated, as usual. The inlet-passage through the coupling and its stem, as shown in Fig. 20, is closed at its end by a plug $g'$ having a passage $g^2$, which plug is removable and is intended for use in case of an excess of gas-pressure, but can be dispensed with where a regulator gas-pressure is used. The gas-supply pipe $G'$ has therein at a point between the burner and the coupling a regulating and shut-off valve consisting, as shown, of an outer wall $G^3$, filling the passage-way of the pipe or tube and having therein holes or ports $g^3$, one on each side of the wall, as shown in Figs. 22 and 23. The wall has a circular hole or bore in which is entered a tube $G^4$, constituting the shut-off section of the valve and having therein on opposite sides holes or ports $g^4$, adapted to be brought into full line with the holes or ports $g^3$, or by turning the tube to be brought only partially into line with the holes or ports $g^3$, or by a sufficient turning of the tube to be entirely shut off from communication with the holes or ports $g^3$, as may be required in the operation of the valve. The hole or passage of the section $G^4$ of the valve has entered thereinto a tube $G^5$, forming the regulating-section of the valve, and having on opposite sides holes or ports $g^5$ of a less diameter than the holes or ports $g^4$, which holes or ports $g^5$ by turning the valve section or tube $G^5$ can be brought in full line with the holes or ports $g^4$, or be brought only partially into line with the holes or ports $g^4$, or be made to wholly pass the holes or ports $g^4$, as may be required in the operation of the valve; but in actual use it is preferred to have the regulating section or tube $G^5$ of the valve so arranged as to never have its holes or ports fully pass the holes or ports $g^4$ in the section or tube $G^4$ of the valve, the intention being to have the section or tube $G^4$ of the valve alone perform the office of shutting off the inflow of the gas through the valve. The section or tube $G^4$ of the regulating and shut-off valve has attached to one end thereof an arm $G^6$, projecting from the extreme end of which is a pin $g^6$ for connecting the arm with its operating rod or stem, and the inner section or tube $G^5$ of the regulating and shut-off valve has attached to one end thereof an arm $G^7$, projecting from the extreme end of which is a pin $g^7$ for the attachment thereto of the operating rod or stem, and the body of the arm $G^7$ has on each side wings $g^8$, in which and through the body of the arm is a slot $g^9$ to allow the pin $g^6$ to project therethrough for the attachment of the operating-rod of the arm $G^6$ in the arrangement shown. The under side of the supply-pipe, forward of the regulating and shut-off valve therein, has a hole or opening $g^{10}$ for the admission of air, as usual in gas heaters or stoves. A rod H is pivotally connected at its lower end to the outer end of the arm $G^6$, and a rod H' is pivotally connected at its lower end to the outer end of the arm $G^7$, which rods actuate the arms independently to turn the sections of tubes of the regulating and shutting-off valve as required. Each rod H and H' has at its lower end a screw-threaded stem $h$ to enter the end of an extension $h'$, having a hole therein for attachment to the projecting pins $g^6$ and $g^7$ of the valve-arms. The threaded connection between each rod and its end extension or connection $h'$ enables the length of the rod to be correctly adjusted for giving the necessary throw to the valve-arm for turning the section or tube of the valve to the extent required, and when adjusted the parts are maintained in their relative position by a lock or jam nut $h^2$ in the arrangement shown. The actuating-rods extend up through a tube $H^2$, and the lower end of the tube extends into a casing or box $H^3$, inclosing the arms of the valve, one side $h^3$ of the casing or box being removable to enable easy access to be had to the valve for regulating and adjusting the throw of the arms, as shown in Figs. 1 and 2. The upper end of the tubular casing $H^2$ is entered into a boss $h^4$ on a cylindrical shell $H^4$, constituting the casing for the gage or register and the mechanisms for operating the regulating and shut-off valve. The rod H, which moves the cut-off or tube of the valve, has its upper end entered into the forked end of a link I and is pivotally held in place by a pin or pivot $i$ or otherwise. The upper end of the link I is connected by a suitable pin or pivot $i'$ to a disk or plate I' on the outer side or face thereof. The disk or plate I' is cut away on its edge, so as to leave a finger $i^2$ and a point $i^3$, and the edge of the plate opposite the point $i^3$ is cut away to leave a circular face on the arc of a circle of less diameter than what would be the full circle of the disk or plate. A plate $I^2$ is located in juxtarelation to the plate I' and in rear thereof. This plate $I^2$ has pivoted thereto a latch or catch $I^3$, having a finger $i^4$ arranged to be engaged by the finger $i^2$ when the disk or plate I' is oscillated for the engagement to raise the latch or catch, and this finger $i^4$ when the disk or plate I' is upwardly oscillated to the limit of its movement underlies and is engaged by or with the point $i^3$, holding the latch or catch in its depressed position, as shown in Fig. 7. The latch or catch $I^3$ at its free end has a curved edge $i^5$, inwardly of which in the lower edge of the latch or catch is a notch $i^6$, which when the latch or catch is raised and advanced engages with a fixed pin $i^7$, as shown in Fig. 8, with which fixed pin the curved free end $i^5$ of the latch or catch engages when in its dropped or depressed position, as shown in Figs. 6 and 7. The under side of the latch or catch has a projected wing $i^8$, carrying the finger $i^4$ and cut away above the finger for the admission of the point $i^3$, and the wing and body of the latch or catch are joined, so as to leave an opening $i^9$ with a curved edge on the under side of the latch or catch for the projection and passage of the finger $i^2$ in the rising-and-falling movement of the oscillating disk or plate I', as shown in Fig. 7. The fixed end of the latch or catch is pivoted to an ear $i^{10}$ by a suitable pin or pivot $i^{11}$, so that with the swing or oscillation of the disk or plate I² the latch or catch will be advanced or receded, as shown in Figs. 6, 7, and 8. The center of the oscillating disk or plate I' has projecting out therefrom a shaft or arbor I⁴, on the outer end of which is a finger-piece or head I⁵, by means of which the disk or plate can be oscillated or turned into the position shown in Fig. 7. The shaft or arbor I⁴ passes through a bushing or bearing I⁶, and the disk or plate I² is loosely mounted on the inner or forward end of the bushing or bearing, so as to be free to oscillate or turn thereon for actuating or moving the latch or catch. A pin I⁷ projects from the inner or rear face of the oscillating disk or plate I' and passes through a curved slot $i^{12}$ in the disk or plate I², so that the engagement of the pin with the end of the slot through the movements of the oscillating disk or plate will oscillate or turn the disk or plate I² to advance and recede the latch or catch. The upward movement of the disk or plate I' through the stem or arbor I⁴ causes the finger $i^2$ to engage the finger $i^4$ and raise the latch or catch, and with the passing of the fingers $i^2$ and $i^4$ the finger $i^4$ drops into the depression or cut-away face on the edge of the disk or plate I' below the point $i^3$, with the end of the finger resting against the edge of the disk or plate and with the free end of the latch or catch resting on the pin $i^7$, as shown in Fig. 7, in which position the link I is raised to the limit of its upward throw or movement, carrying with it the rod H and raising the arm G⁶, turning the outer section or tube of the regulating and shut-off valve for the holes or ports $g^4$ therein to be in full line with the holes or ports $g^3$, allowing the full head of gas to pass through the holes or ports. The disk or plate I', with the link I and the rod H, are returned to normal or depressed position for the disk or plate by a spring $h^5$, one end of which is engaged with the rod, and the other end is attached to the rim or wall of the shell or casing of the register, as shown in Fig. 6, which return is automatic with the tripping of the dog or pawl, as hereinafter described.

A ratchet-wheel J, having ratchet-teeth $j$, is located at one side of the disks or plates I' and I², and this ratchet-wheel is fixedly mounted on an arbor or shaft, to which is secured one end of a coil-spring J', the other end of which is attached to a pin or a stud $j'$ on the casing or shell of the gage or register, so that by winding the spring the ratchet-wheel will be placed under the force or tension of the spring, which will operate with the release of the ratchet-wheel to give a reverse rotation thereto. A dog or pawl J² projects from the periphery of the disk or plate I² for its acting end when the parts are, as shown in Figs. 3, 6, and 7, to be engaged with one of the ratchet-teeth $j$ of the ratchet-wheel J, holding the ratchet-wheel against the resistance of the spring when the spring is wound. The dog or pawl J² on its inner or front face has pivotally suspended therefrom an arm J³ by means of a suitable pin or pivot $j^3$, which arm is locked to the dog or pawl, so as to have a little lost motion or play by a pin $j^4$, projecting from the arm and entered into a slot $j^5$ in the face of the dog or pawl for the engagement of the pin with the end of the slot to cause the arm to force or carry down the dog or pawl, turning with it the disk or plate I² and bringing the parts into the position shown in Fig. 6. The arm J³ is engaged by a pin $j^6$, projecting from the inner or front face of the ratchet-wheel, so as to engage a curved edge or face $j^7$ on the edge of the arm for the engagement of the pin and the curved edge or face to force down the arm, carrying with it the pawl, and the curvature of the edge or face $j^7$ is on the arc of a circle in which the pin $j^6$ travels with the turning of the ratchet-wheel. The arm J³ is engaged by the pin $j^6$ when the arm is in its raised position, as shown in Fig. 8, and the arm is carried or forced down as the pin is carried around with the turning of the ratchet-wheel to the position shown in Fig. 6, and with the arm, as in Fig. 6, the pin passes over the curved edge or face $j^7$. The necessary lost motion to compensate for the space occupied by the pin $j^6$ on the ratchet-wheel in relation to the teeth is provided for by the slot $j^5$, in which the pin $j^4$ moves, and this provision for lost motion is necessary in order to obtain an accurate working of the mechanism. The shaft or arbor carrying the ratchet-wheel has fixedly mounted thereon a disk J⁴ and has loosely mounted thereon a disk J⁵, the two disks facing each other in juxtarelation, as shown in Fig. 5. The fixed disk has projecting from its inner or front face a pin $j^8$, which enters a slot $j^9$ in the loose disk, as shown in Fig. 31, which pin and slot connect the two disks for the two disks to revolve together when the pin is engaged with either end of the slot. The loose disk has projecting from its outer or front face a lug or pin $j^{10}$, which engages with a lug or pin $j^{11}$ on a gear-wheel J⁶, loosely mounted on the shaft or arbor J⁷, which carries the ratchet-wheel, so that with the engagement of the pins or lugs $j^{10}$ and $j^{11}$ the loose disk will be carried around until the opposite end of the slot $j^9$ engages with the pin $j^8$, locking the fixed disk, the loose disk, and the loose gear together for the three to revolve as one with the reverse revolving of the stem or arbor $J^7$ from the action of the spring with the release of the ratchet-wheel J from the retaining dog or pawl $J^2$, returning the parts to their normal position. The slot $j^9$ is of the requisite length to furnish the necessary lost motion for the space occupied by the two engaging lugs or pins of the loose disk and the loose gear, which provision for lost motion is required for the accurate and correct working of the mechanism in controlling and regulating the supply-valve.

The shaft or arbor $J^7$ has on its projected rear end a finger piece or head $J^8$, by means of which the shaft or arbor and the ratchet-wheel, the fixed disk, and the loose disk can be turned forwardly to wind up the spring to the predetermined point on the scale of the gage or register for the position of the setting hand or pointer, which forward turning of the hand or pointer can be any point between the starting-point and the end of the scale, and when the end of the scale is reached the pins or lugs on the loose disk and the loose gear will engage, preventing further advance or turning of the setting hand or pointer beyond the end of the time-scale to any great extent.

The construction and arrangement of the two oscillating or swinging disks or plates, the latch or catch, the ratchet-wheel, its dog or pawl and the arm therefor, and the fixed and loose disks and the loose gear are shown in Figs. 5, 6, 7, 8, 27, and 31 specifically, and with the parts as shown in Fig. 6 the section or tube of the valve for cutting off the supply of gas is in its normal position or closed position, and with the parts as shown in Fig. 7 this section or tube of the valve is in its widest open position, and with the parts as shown in Fig. 7 the mechanism is set for the parts to drop into the position shown in Fig. 6 at a predetermined point or space on the time gage or register.

The upper end of the rod H' is pivotally connected to the lower end of a link K by a suitable pin or pivot $k$ or otherwise. The upper end of the link K is pivotally connected with a disk or plate K' by a pin or pivot $k'$, which passes through a slot $k^2$ in the disk, allowing of a limited drop of the link and the connecting-rod under certain conditions, and, as shown, the body of the disk or plate K' on one side has a series of holes which gives a preponderance of weight to a slight extent for the opposite side of the disk or plate and insures the overbalancing of the disk or plate, so as to drop from a raised position. A companion disk or plate $K^2$ is located in front of and in juxtarelation to the disk or plate K', with a space between the adjacent faces of the two disks or plates. A dog or pawl $K^3$ is located on the inner or rear face of the disk or plate $K^2$ and is pivotally attached to the disk or plate by a pin or pivot $k^3$, and its free end is cut out to form a slight depression $k^4$, which engages with a pin $k^5$, projecting from the inner or front face of the disk or plate K', so that the turning of the plate $K^2$ will turn the plate K' for a portion of a revolution. The plates are held apart and spaced by a hub or center $K^4$ on the plate $K^2$, the hub on one side having therein a notch $k^6$ of a somewhat V-shaped formation, one side, however, of the notch being longer than the other, into which notch $k^6$ a pin $k^7$, projecting from the inner or front face of the disk or plate K', enters with the dropping of the disk or plate, furnishing a limit to the downward dropping of the disk or plate. The inner or rear face of the disk or plate $K^2$ has thereon a counterbalancing-weight $K^5$, attached to the face of the disk or plate by pins or screws $k^8$ or by other suitable means, so as to act as counterpoise for the pawl or dog $K^3$ and maintain an equilibrium for the disk or plate $K^2$ in its operation. A drop latch or catch $K^6$, pivotally mounted by a suitable pin or pivot $k^9$, is located above the disk or plate K' and has on its under edge a projection $k^{10}$ to engage with a notch $k^{11}$ in the periphery of the disk or plate K' and stop the turning of the plate at a half-revolution upwardly, and, as shown, the periphery or edge of the disk or plate on the forward side of the notch is cut away, so as to insure the dropping of the latch or catch $K^6$ into engagement with the notch and furnish a positive stop against further turning of the disk or plate. The heel or fixed end of the drop latch or catch $K^6$ has therein a notch $k^{12}$ to engage a fixed pin $k^{13}$ and limit the downward fall of the latch or catch and hold the forward end of the latch or catch in position to be engaged with the notch in the disk or plate K' at the limit of a half-turn upward of the disk or plate. The disk or plate K' as it is turned from its normal position (shown in Fig. 9) to carry the slot $k^2$ upward carries with it the pin or pivot $k'$ to the position shown in Fig. 10 and raises the link K and with the link the rod H' for the upward movement of the rod to raise the outer end of the arm $G^7$ and turn the regulating section or tube $G^5$ of the valve for the movement upward to the limit to turn the section or tube $G^5$ into a position to nearly close communication between the holes or ports $g^5$ and the holes or ports $g^4$, allowing a limited supply of gas to pass through the valve to the burner. The parts in the arrangement shown in Fig. 9, with the pin or pivot $k'$ at the lower end of the slot $k^2$, is the normal position, and in this position the link K has descended to the limit of its downward movement, carrying with it the rod H', forcing down the arm $G^7$ and turning the regulating section or tube $G^5$ of the valve to a position where the holes or ports $g^5$ open to a full communication with the holes or ports $g^4$, allowing a full supply of gas to pass through the valve sufficient to maintain a full flame at the burner. The disk or plate K' is raised or turned upwardly by the engagement of the dog or pawl K³ at its acting end with the pin $k^5$, and with such upward turning of the plate the link K and the rod H' are gradually raised, raising the outer end of the arm G⁷ and gradually turning the regulating section or tube G⁵ of the valve to nearly close the holes or ports $g^5$ from communication with the holes or ports $g^4$ and allowing only a limited supply of gas to pass through the valve. The upward turning or raising of the disk or plate K' continues for a half-revolution, or nearly so, and until the projection $k^{10}$ engages the notch $k^{11}$, at which point the disk or plate K² has a slightly rearward or backward turn given thereto, disengaging the free end of the dog or pawl from the pin $k^5$, allowing the free end of the dog or pawl to drop into a plane beneath the plane of the pin, and at the same time the plate K' drops to the limit of the slot $k^2$ and in dropping the end of the slot $k^2$ strikes against a pin or screw $k^{14}$, entered into the hub of the plate K² or the end of the shaft carrying said plate, and this screw or pin $k^{14}$ has its body outside of its threaded part beveled to engage with the beveled sides of the slots $k^2$ and furnish the means for holding the plate K' in place and free to move to the limit of the slot in either direction up or down, and the pin or screw also serves as a pivot on which the plate K' turns with the plate K² when the dog or pawl is engaged and on which the plate K' turns in assuming its normal or drop position. The engagement of the dog or pawl with the pin $k^5$ raises the plate K' up to the limit of a half turn or revolution or so long as the dog has a forward or advance movement given thereto from the forward travel of the disk K², and with the release of the engagement between the dog or pawl and the pin $k^5$ the plate K' is free to drop or fall to the limit of the slot at its center and the limit of the passage of the pin $k^7$ into the notch $k^6$, and the pin $k^7$ in connection with the circular periphery of the hub K⁴ furnishes a guide for maintaining the center of the plate K' during the time the pin $k^7$ is in engagement with the periphery of the hub, giving the plate K' a travel in a true circle. An arm or lever L is pivotally connected at one end in the arrangement shown, with the pin or pivot $k$ between the link K and the rod H' and at the opposite end carries a weight or counterpoise L' to counterbalance the weight of the rod H', giving the full side of the disk or plate K' the balance of power to cause the disk or plate K' to drop from the position shown in Fig. 10 to the position shown in Fig. 9, when the center through the pivot $k^{14}$ is passed in the forward travel of the disk or plate, thus enabling the disk or plate of its own volition to return to normal position, and with the counterbalancing of the weight of the rod H' with the weight or counterpoise L' the lifting or forward turning of the disk or plate K' is not effected by the weight of the rod, and the only resistance or weight to be overcome is that of the full side of the disk or plate, making the turning or lifting of the plate easy of performance. The arm or lever, as shown, is pivotally mounted on a fixed pin or pivot $l$ at the end of a stud or projection $l'$, and the pivot is so located as to be in proper relation for the movements of the rod H' and the counterpoise or weight in the operation of the mechanism.

The loose gear J⁶ is engaged by a rack M, which is one of three racks carried by a common head or hub M³, with the rack M connected to the hub by an arm $m$ and the rack M' connected to the hub by an arm $m'$ and the rack M² connected to the hub by an arm $m^2$, and the arms project laterally from the center, so as to bring in the arrangement shown the rack M at the rear, with the rack M' slightly in advance of the rack M and the rack M² at the front, as shown in Figs. 3 and 5. A short shaft N, having at each end a journal $n$, is fixedly mounted within the casing of the gage or register, and this shaft at one end has fixed thereto a gear-pinion N', which meshes with the rack M', and on the shaft N is a gear-wheel N², which meshes with a gear-pinion N³, fixed on a shaft N⁴, which shaft carries the disk K², so that with the turning of the wheel N² from the engagement of the rack M' with the pinion N' the disk K² will be turned or oscillated, and, as shown, the shaft N⁴ has on its projecting end a balance-wheel N⁵ to act against the disk K² in the operation of the mechanism. The rack M² engages with a gear-wheel O on a stem or arbor $o$, which is encircled by a sleeve or bushing $o'$, carrying a gear O', which gear O' meshes with a gear O², in mesh with a gear O³ on the shaft or arm J⁷, so that with the turning of the shaft or arm the gear O' will be turned correspondingly. The sleeve or arm $o'$ carries the setting-hand or pointer P, which can be advanced to any desired point on the scale $p'$ by turning the winding shaft or arbor to bring the end of the pointer at any desired number on the scale. The stem or arbor $o$ carries the intermittently-movable hand P' for such hand to be advanced with the turning of the gear O from the upward movement of the rack M², such turning proceeding point by point until the point at which the setting-hand is fixed on the scale of the gage is reached, at which point the coinciding position of the movable hand or pointer and the setting-hand or pointer brings the pins or lugs on the loose gear J⁶ and the loose disk J⁵ into engagement, tripping the dog or pawl and freeing the ratchet-wheel for the parts to return to normal position. The scale $p'$, as shown, is in the form of spaced and numbered intervals on a plate $p$, secured in the front of the casing $H^4$ back of the pointers or hands and can be of any suitable arrangement for indicating points thereon up to a certain limit—as, for instance, from zero to one hundred—as shown in Fig. 18, indicating one hundred points between the beginning and terminus of the scale to any predetermined point of which the setting-hand can be turned and stopped, the predetermined point being one that will cover a period of time required for the cooking operation, such period of time being governed by existing conditions, as amount of water, degree of heat, quality of fuel, radiation from the cooker, and the general environments, which condition should be the same in order to control the same period of time approximately for each operation.

The cylindrical shell or casing $H^4$ on its inside at the rear has a rim Q, (shown in Figs. 3 and 4,) and the inside of the cylindrical casing at the front, as shown, has lugs or ears $q$ and $q'$, with the ears $q$ at the top and the bottom and the ears $q'$ on opposite sides. Extending from the rim Q inwardly are arms Q' at the back of the casing. A bracket-arm $Q^2$, having ears or wings $q^2$ for attachment to studs $q^3$, projected from the rim Q, extends inwardly at one side the center of the casing, and in this plate and one of the arms Q' is journaled the shaft N. A depending arm $q^4$ extends from the bracket-arm $Q^2$ and carries the pivot for the arm or lever L in the arrangement shown. An upward extension of the bracket plate or arm $Q^2$ has an ear $q^5$, carrying the pivot-pin $k^9$ for the dog or catch $K^6$, and another ear $q^6$ on this upward extension of the bracket plate or arm is attached to a stud $q^3$, projecting inwardly from an arm Q', as shown in Fig. 4 more particularly. The bracket plate or arm $Q^2$ furnishes the support or bearing for the shaft $N^4$ and the parts mounted on said shaft, and this plate, as shown in Fig. 5, is in the rear of the rack-head and forward of the mechanisms with which the actuating-rods of the regulating and shut off valves are connected.

The rack-head $M^3$, as shown, has a center tube $m^3$, into the lower end of which is entered the upper end of a piston-rod R, carrying a piston $r$, which reciprocates in a cylinder R', which cylinder is open at the lower end and projects into the interior of the outer vessel, passing through the top rim of the vessel. The upper end of the cylinder R' is attached to the outer face of the wall of the casing of the gage or register and in the wall, as shown, and encircling the piston-rod R is a suitable packing $r'$, which will prevent any steam that may pass the piston $r$ from gaining admission into the interior of the casing. The upper end $r^2$ of the piston-rod R, as shown, is reduced in size and is locked in the socket or tube $m^3$ of the rack-head by a set-screw $r^3$ or in any other suitable manner. A rod S extends from the socket or tube $m^3$ of the rack-head upwardly. The lower end of the rod has a screw-threaded stem $s$, which is entered into the socket or tube $m^3$ connecting the rod with the racks, and the upper end of the rod extends through the wall $H^4$ and has attached thereto a weight S', which weight is for the purpose of returning the racks to full normal position and give a reverse rotation to the gear which operates the plate $K^2$ when the plate K' is at its highest point of lift or rise and the pressure of the steam is reduced, at which time a reverse travel must be given to the actuating-gears of the plate $K^2$ to a slight extent for releasing the engagement between the disks K' and $K^2$, allowing the disk K' to drop or fall to open the holes or ports in the regulating section or tube of the valve, and to govern the pressure within the cooking vessel, for which purpose the weight is detachable, allowing lighter weights and heavier weights to be used as required for the pressure, or the weight could be a sectional one, so that by removing and replacing one or more sections the force exerted by the weight can be decreased or increased as required.

The operation is as follows: The cover of the outer vessel is swung so as to enable access to be had to the interior of the vessel, for which purpose the locking-pins are withdrawn and the spider with the cover turned on the pivot-hinge. The cooking vessels or receptacles F, with the article to be operated upon therein, are inserted within the outer vessel and held in position on the support E, the smaller cooking vessel or receptacle being first inserted, and after the required number of cooking vessels or receptacles have been placed in position the cover is swung over the opening in the top of the outer vessel, fastened by the locking-pins, and forced down by the threaded stem, so as to make a steam-tight joint between the cover and the top of the outer vessel when the vessel is ready for use, it being understood, of course, that water for producing the steam is first placed in the vessel. The operator first turns the winding shaft or arbor $J^7$, which winds up the spring and at the same time, through the train of gear O', $O^2$, and $O^3$, advances the setting hand or pointer P to the predetermined point on the scale $p'$ to cover the length of time required for the cooking, which, for instance, may be considered as the point on the scale numbered "25," and in turning the shaft or arbor $J^7$ the ratchet-wheel J is correspondingly turned, and during such advance movement or turning of the ratchet-wheel the dog or pawl $J^2$ at its acting end $j^2$ passes successively each tooth $j$ of the ratchet-wheel, engaging the succeeding tooth, which operation is produced by the action of the latch or catch $I^3$, which is in the position shown in Fig. 6, with the curved face $i^5$ of its free end resting on the pin $i^7$, so that with the rise of the acting end of the dog or pawl to pass a tooth the free end of the latch or catch rides up on the pin $i^7$, and as each tooth of the ratchet-wheel is passed by the acting end of the dog or pawl the weight of the latch and the contact of its free end with the pin causes the acting end of the dog or pawl to drop into engagement, thus insuring the engagement of the acting end of the dog or pawl with the ratchet-teeth and the retention of the dog or pawl with the ratchet-disk after the limit of winding has been reached. The shaft or arbor $I^4$ is then turned to lift or raise the disk $I'$ and with it the link I and the rod H, which, through the arm $G^6$, turns the shut-off section or tube of the valve into position for the holes or ports $g^4$ to be in full communication with the holes or ports $g^3$, and at such time the disk $K'$ is at its lower limit of descent, with the link K and the rod $H'$ down, in which position the arm $G^7$ is turned for the holes or ports $g^5$ in the regulating-section $G^5$ of the valve to be in full communication with the holes or ports $g^4$ of the shut-off section of the valve. The turning of the disk $I'$ into its elevated or raised position causes the finger $i^2$ to engage the finger $i^4$, and with the passage of the disk or plate $I'$ into the position shown in Fig. 7 the latch or catch $I^3$ drops into the position shown in Fig. 7, with the dog or pawl $J^2$ engaged with the ratchet-wheel J, holding the spring in its wound condition and holding the shaft or arbor against return, with the fixed and loose disks connected together by the engagement of the pin and the slot of the disks, the loose disk having been carried around for its pin or lug $j^{10}$ to be in advance of the pin or lug $j^{11}$ on the loose gear a corresponding distance to the advance of the setting-hand or pointer on the scale in proportionate ratio. The gas is now free to flow through the regulating and controlling valve and the pipe $G'$ to the burner G, where it can be ignited in the usual way. The heat from the burner acts on the water contained in the outer vessel, producing steam, and the steam gradually rises in pressure, acting on the piston $r$, and during the period of time required for raising the steam, which varies with the amount of water and the degree of heat, the regulating and controlling mechanism for the supply of gas remains inactive and in a condition in which it was adjusted and will so remain until the pressure is sufficient to overcome the resistance of the rack-bars and the weighted rod, and when this point is reached the piston gradually rises in its cylinder, raising the rack-bar. The upward movement of all the rack-bars is simultaneous, and in the upward movement the rack-bar M engages and turns the gear-wheel $J^6$, which is loose on the shaft $J^7$, advancing such gear-wheel. The rack-bar $M'$ engages the pinion $N'$ and turns the shaft N to turn the wheel $N^2$ and turns the pinion $N^3$ to turn the disk $K^2$ forwardly for the latch $K^3$ at its free end by its engagement with the pin $k^5$ to turn the plate $K'$ forwardly or with an upward movement or rise, which movement of the disk or plate $K'$ raises the link K and the rod $H'$, lifting the arm $G^7$ and turning the regulating section or tube of the valve in the direction to close the holes or ports $g^5$ against full communication with the holes or ports $g^4$, reducing the supply of gas passing through the valve, and consequently the heat generated at the burner, and the upward movement of the rack-bar $M^2$ turns the gear O to turn the arbor or stem $o$ in the direction required, advance the movable hand or pointer $P'$ toward the set position of the set hand or pointer. The upward movement of the rack-bar continues until the pressure or force of the steam acting against the piston $r$ in the cylinder R has, through the piston-rod R, raised the rack-bars to a position where the train of gear for the plate $K^2$ has turned the plate forward to a point where the plate $K'$ has reached the point of the half-circle or turning, as shown in Fig. 10, at which time the link K and the rod $H'$ have been raised so as to nearly close the holes or ports $g^5$ and $g^4$, allowing a small amount of gas to pass through the valve, reducing the flame at the burner to its limit, and with such reduction of the flame the heat decreases, reducing the pressure of the steam against the piston, which stops the further upward movement of the rack-bars the bars remain in their raised position until the pressure of the steam is reduced sufficient for the governing-weight $S'$ to overcome the exerted force of the steam and carry back the rack-bars, reversing the turning of the train of gear and giving a slight backward turn to the disk or plate $K^2$, allowing the latch $K^3$ and the pin $k^5$ to be disengaged and the plate $K'$ to drop to the limit of the slot $k^2$ and the pin $k^7$ to enter the notch or recess $k^6$, which dropping of the plate $K'$ causes the link K and the rod $H'$ to descend, turning the regulating section or tube of the valve so as to increase the opening between the holes or ports $g^5$ and $g^4$, allowing more gas to pass through the valve for consumption at the burner, increasing the heat at the burner and for the increased heat to again raise the pressure of the steam in the vessel. The increase in pressure of the steam when sufficient to overcome the weight of the rack and the governing weight and rod acts on the piston and again raises the rack-bars, turning the train of gear to again advance the disk or plate $K^2$ with the dog or pawl initially engaged with the pin $k^5$ to advance the disk or plate $K'$ until the center of gravity is passed for the disk or plate $K'$, which will drop or turn downwardly of its own volition through the overbalance on its full side, dropping the link K and the rod $H'$ and turning the regulating section or tube of the valve to a position for full opening the holes or ports $g^5$ with the holes or ports $g^4$, allowing a full head of gas to pass the valve to supply the burner. Each fall of the pressure of the steam operates to reverse the train of gear for the plate $K^2$, allowing the disk or plate $K'$ to drop into position for fully opening the regulating section or tube of the valve, and with the increase of the pressure in each instance, after the disk or plate $K'$ has dropped, the disk or plate $K^2$ will be advanced and the advance will continue until the disk or plate $K'$ is raised to the position shown in Fig. 10, nearly closing the regulating section or tube of the valve. These alternating operations of the train of gear and the disks or plates $K'$ and $K^2$ will continue until the movable hand or pointer P' has been advanced to a position in line with the setting hand or pointer by the action of the rack-bar $M^2$ and the gear O through the stem or arbor $o$, it being understood that with each reverse movement of the disk or plate $K^2$ the movable hand or pointer is turned backward to the extent of the limit of the drop of the rack-bars, as the reduction of pressure is not such as to allow the rack-bars to fully drop. When the time hand or pointer reaches and slightly passes the setting hand or pointer, the rack-bar M has turned the loose gear $J^6$ to a point where the pins or lugs on the loose gear and the loose disk engage, giving with the further advance of the loose gear a reverse movement to the loose disk, causing the pin in this disk to engage the opposite end of the slot in the fixed disk on the winding shaft or arbor, turning the shaft or arbor, and with it the ratchet-disk, throwing up the acting end of the dog or pawl out of engagement with the ratchet-teeth of the disk, allowing the spring to act and give a reverse rotation to the winding shaft or arbor and the ratchet-wheel and the fixed and loose disks, returning these parts to normal position, and with the upward throw of the dog or pawl, which releases the disk I', the spring $h^5$ acts and carries down the disk I', causing the finger $i^2$ to engage the under face of the latch or catch $I^3$, raising the latch or catch for its free end to pass over the pin $i^7$ and the notch $i^6$ to engage with the pin, holding the plate $I^2$, with its dog or pawl $J^2$, in a raised position, as shown in Fig. 8, in which position the arm $J^3$ is raised and the parts remain in this condition until the reverse turning of the ratchet-wheel J causes the pin $j^6$ to contact the curved edge or face $j^7$ of the arm, which engagement carries the arm $J^3$ down, and with it the ratchet dog or pawl and the disk $I^2$, disengaging the latch or catch $I^3$ from the pin $i^7$ and returning the parts to the normal position shown in Fig. 7 ready for the next operation of the cooker in supplying gas to the burner. The rack-bars after the supply of gas is shut off from the burner through the medium of the governing weight and the rod are gradually returned to normal position with the reduction of pressure in the cooking vessel, and such return of the rack-bars to normal position brings the disk or plate $K^2$ into normal position for fully opening the holes or ports in the regulating section or tube of the valve, the disk or plate $K'$ having dropped to normal position with the passing of the hands or pointers of its own volition, thereby opening the regulating section or tube of the valve, and with the return of the parts to normal position ready for the next operation the set-hand is returned to the starting-point by the reverse turning of the winding shaft or arbor, and the time-hand is returned to normal position by the return of the rack-bars to normal position. It will thus be seen that the duration of the operation is indicated on the scale and that thereafter the operation of the cooker is entirely automatic as regards the control of the gas-supply and the entire shutting off of the supply at the proper time, thus avoiding any overcooking of the articles in the vessel.

It will be seen that initially and until the heat has operated to raise steam the parts will remain in their set normal condition for a full flow of gas or vapor to the burner; that the steam as it increases in volume and pressure will act against the end face of the piston $r$, raising the piston and with it the piston-rod R and the rod S, with the governing-weight S', and also at the same time and coincidently raising the racks M, M', and $M^2$; that the upward movements of the racks operate the respective gears connected therewith; that the turning of the gear N turns the shaft of the disk $K^2$, and through the engagement of the dog $K^3$ with the pin $k^5$ turns the disk $K'$, raising the rod K, and the rod H' gradually closing the inlet of the gas or vapor supply pipe by diminishing the opening of the inner section of the regulating and controlling valve; that such turning of the disk $K'$ continues until the pin $k^5$ stands vertical and the stem K has its pivot also essentially in a vertical plane and the pin $k^7$ is in position to drop to the limit of the slot in the disk-hub; that as the parts reach this position the inflow of gas or vapor has been so much reduced as to lessen the pressure on the piston $r$ for the piston to recede slightly and to an extent sufficient to clear the end of the pawl $K^3$ from its engagement with the pin $k^5$, permitting the disk $K'$ with the pins $k^5$ and $k^7$ to drop and drop the stem K to the limit of the slot in the disk-hub, and dropping of the stem K carries down with it the rod H', turning the inner section of the valve partially into its full-open position for an increased supply of gas or vapor to flow to the burner; that the additional flow of gas or vapor will increase the heat at the burner increasing the volume and pressure of the steam to a point where the piston $r$ will commence again to raise from its slightly-dropped position, carrying with it the racks for the racks to turn their respective gears, the gear N, turning the disk K² forward, and with the forward turn of the disk K² the hub of the disk will turn therewith, such turning of the hub allowing the pin $k^7$ to escape from the slot $k^6$ for the disk K' to drop to its full limit and carry with it the rod H', turning the inner section of the valve for a full head of gas or vapor to flow to the burner; that with the full head of gas or vapor the steam-pressure will increase and the piston $r$ will be further raised from its partially-raised position and such upward movement will continue until the pawl K³ again engages the pin $k^5$ and raises the disk K' to again partially shut off the valve, as described; that the interval of time between the points when the gas or vapor is fully supplied and nearly cut off is of equal duration, when the water is the same in quantity, the radiation of the heat from the cooking vessel is the same, or approximately so, and the conditions under which the cooking operations were first started remain the same and will always be of equal duration whether figured in minutes or seconds—that is to say, it will require a certain number of minutes for the steam to reach a point of pressure to act on the piston and raise the piston and a certain limit of time in minutes for the decrease of temperature to reduce the steam-pressure for the piston to return slightly, and that this interval of time for each complete operation of moving the controlling-valve for the amount of gas or vapor supplied will be practically the same. The upward movement of the movable hand or pointer rack advances the hand a distance equal to any number of points on the dial for the distance of travel of the rack, and with the slight return movement of the rack the movable hand or pointer will drop slightly from its advanced position and there remain until the next upward movement of its operating-rack, and that when the operating-rack for the movable hand or pointer has advanced said hand or pointer a distance to reach the point at which the set hand or pointer is located then the rack which operates the gear of the ratchet-wheel shaft will have operated sufficiently to turn the shaft a distance to release the dog of the ratchet-wheel, dropping the retaining-latch of the disk I', allowing the stem I to drop, carrying down the rod H and entirely shutting off the supply of gas or vapor by turning the section or member G⁴ out of communication with the ports of the supply-tube G' for the gas or vapor to the burner. The piston will be actuated in both directions by the increase and decrease of the heat so long as the gas or vapor supply is under control as to a greater or less volume admitted to the burner, and the movements of the piston are not retarded so long as the cut-off section of the valve remains open, but will be retarded or stopped when it reaches its lowermost position, as the cut-off section or member of the valve is then turned so as to be out of communication with the ports of the gas or vapor supply tube. The movements of the piston up and down are dependent upon the movement of the disk K' and will continue until the movable hand has been advanced to a point where it coincides with the set or trip hand, thus operating both the disks I' and K' to drop both rods H and H' and entirely shut off the supply of gas or vapor, and inasmuch as the interval of time between the raising of the steam-pressure to a point where the piston will raise the racks to drop the disk K' and to retain the racks in a rest position is practically in each instance the same it follows that a repetition of these intervals sufficient to carry the movable pointer in line with the set-pointer will intervene before both members or sections of the valve are actuated, thus enabling a predetermined period of cooking to be carried on, such period of cooking depending on the number of actuations of the disk K', through the rise and fall of the piston from the increase and decrease of the steam-pressure by reason of the increase and decrease of the gas or vapor supplied to the burner. The piston, it will be seen, constitutes the prime mover for the operation, and this piston is actuated under a certain amount of steam-pressure—that is, starting from the initial pressure it will be moved up gradually, and such upward movement will continue until the pivot of the rod H' to the disk K' has been carried to a vertical position, during which time the steam-pressure has been gradually reduced by reason of the partial shut off of the volume of gas or vapor supplied to the burner, causing a decrease of steam, which will allow the piston to slightly return, but not to its normal position, and starting from the return point the piston will be again raised, as the pressure of the steam increases with the increase of the supply of gas or vapor to the burner, making the upward movements of the piston approximately regular and covering in each full movement of the disk K² a period of time essentially the same in duration, so that if the pointers were adjusted and arranged for minutes the time occupied would be the number of minutes at which the trip hand or pointer were set, and in any event the period of cooking would be that covered by the length of time required for the movable hand or pointer to reach and line with the trip hand or pointer.

What I regard as new, and desire to secure by Letters Patent, is—

1. In a steam cooking vessel, the combination of a burner, a fluid-fuel-supply pipe leading to the burner, a valve in the fluid-fuel-supply pipe and consisting of a tubular shut-off section and a tubular supply-regulating section located and operative in the shut-off section, the two sections of the valve controlling the supply of fluid fuel to the burner, means for automatically operating one of the two sections of the valve to alternately decrease and increase the supply of fuel to the burner from an increase of steam-pressure in the cooking vessel, and means for automatically closing the other section of the valve to cut off completely the supply of fuel to the burner when the steam-pressure in the vessel has reached a predetermined maximum, the two means operating independently of each other and governing the heat at the burner, substantially as described.

2. In a steam cooking vessel, the combination of a burner, a fluid-fuel-supply pipe leading to the burner, a shut-off and regulating valve in the fluid-fuel-supply pipe and consisting of a wall having ports therein and extending across the passage-way of the pipe, an outer tube entered into the wall and having ports therein to coact with the ports in the wall, and an inner tube entered into the outer tube and having ports therein to coact with the ports of the outer tube, each tube adapted to be independently operated, means for automatically operating one of the two tubes to alternately decrease and increase the supply of fuel to the burner from an increase of steam-pressure in the cooking vessel, and means for automatically closing the tubes to cut off completely the supply of fuel to the burner when the steam-pressure in the vessel has reached a predetermined maximum, the two means operating independently of each other and governing the heat at the burner, substantially as described.

3. In combination with a steam cooking vessel, a burner, a gas-supply pipe leading to the burner, a valve mechanism in the gas-supply pipe and consisting of a wall having ports therein and extending across the passage-way of the pipe, an outer tube entered into the wall and having ports therein to coact with the ports in the wall, and an inner tube entered into the outer tube and having ports therein to coact with the ports of the outer tube, each tube adapted to be independently oscillated, an arm for each tube, and a rod for each arm, each rod connected with a regulating and controlling mechanism for actuating the rods and opening and closing the valve, substantially as described.

4. In combination with a steam cooking vessel, a burner, a gas-supply pipe leading to the burner, a valve mechanism in the gas-supply pipe and consisting of a wall having ports therein and extending across the passage-way of the pipe, an outer tube entered into the wall and having ports therein to coact with the ports in the wall, and an inner tube entered into the outer tube and having ports therein to coact with the ports of the outer tube, each tube adapted to be independently oscillated, an arm for each tube, and a rod for each arm, each rod having an adjustable end for connection with the arm and each rod connected with a regulating and controlling mechanism for actuating the rods to open and close the valve, substantially as described.

5. In combination with a steam cooking vessel, a burner, a gas-supply pipe leading to the burner, a valve mechanism in the gas-supply pipe and consisting of a wall having ports therein and extending across the passage-way of the pipe, an outer tube entered into the wall and having ports therein to coact with the ports in the wall, and an inner tube entered into the outer tube and having ports therein to coact with the ports of the outer tube, each tube adapted to be independently oscillated, an arm for each tube, a rod for each arm, a casing surrounding the valve, the arm and the rod, and each rod connected with a regulating and controlling mechanism for actuating the rods and opening and closing the valve, substantially as described.

6. In combination with a steam cooking vessel, a regulating and shut-off valve mechanism for the gas-supply, a rod connected with the shut-off section of the valve, a plate having the upper end of the rod connected therewith, a finger on the plate, a companion plate carrying a drop-latch, and a pawl, a finger on the drop-latch engaged by the finger on the rod-plate, and a spring-controlled ratchet-wheel engaged by the pawl for raising the actuating-rod of the shut-off section of the valve to open the valve, substantially as described.

7. In an automatic steam-cooker and in combination with a valve mechanism having a shut-off section, a rod, an oscillating plate having the rod connected therewith, a companion plate carrying a pawl, a ratchet-wheel engaged by the pawl, a shaft carrying the ratchet-wheel, a spring for the shaft, and a trip for releasing the pawl and allowing the oscillating plate carrying the rod to drop, substantially as described.

8. In an automatic steam-cooker and in combination with a valve mechanism having a shut-off section, a rod, an oscillating plate having the rod connected therewith, a companion plate carrying a pawl, a stem projecting from the oscillating plate and having the companion plate mounted thereon, a ratchet-wheel engaged by the pawl, a shaft carrying the ratchet-wheel, a spring for the shaft, and a trip for releasing the pawl and allowing the oscillating plate carrying the rod to drop, substantially as described.

9. In an automatic steam-cooker and in combination with a valve mechanism having a shut-off section, a rod, an oscillating plate having the rod connected therewith, a companion plate carrying a pawl, a stem projecting from the oscillating plate and having the companion plate mounted thereon, a drop-latch pivotally connected with the companion plate, a pin engaged by the free end of the drop-latch, a ratchet-wheel engaged by the pawl, a shaft carrying the ratchet-wheel, a spring for the shaft, and a trip for releasing the pawl and allowing the oscillating plate carrying the rod to drop, substantially as described.

10. In an automatic steam-cooker and in combination with a valve mechanism having a shut-off section, a rod, an oscillating plate having the rod connected therewith, a companion plate carrying a pawl, a ratchet-wheel engaged by the pawl, an arm on the pawl, a pin on the ratchet-wheel engaging the arm, a shaft carrying the ratchet-wheel, a spring for the shaft, and a trip for releasing the pawl and allowing the oscillating plate carrying the rod to drop, substantially as described.

11. In an automatic steam-cooker and in combination with a valve mechanism having a shut-off section, a rod for actuating the valve-section, means for raising and lowering the rod, a ratchet-wheel for retaining the rod in a raised position, a shaft carrying the ratchet-wheel, a spring for the shaft, a fast disk and a loose disk on the shaft connected with each other, a loose gear on the shaft connected with the loose disk and a rack-bar raised by the pressure of steam in the cooking vessel for releasing the ratchet-wheel and allowing the actuating-rod of the valve-section to drop, substantially as described.

12. In an automatic steam-cooker and in combination with a valve mechanism having a shut-off section, a rod for actuating the valve-section, means for raising and lowering the rod, a ratchet-wheel for retaining the rod in a raised position, a shaft carrying the ratchet-wheel, a spring for the shaft, a fast disk and a loose disk on the shaft connected with each other, a loose gear on the shaft connected with the loose disk, a rack-bar engaging the loose gear, and a piston operated by the pressure of steam in the cooking vessel for raising the rack-bar, substantially as described.

13. In an automatic steam-cooker and in combination with a valve mechanism having a shut-off section, a rod for actuating the valve-section, means for raising and lowering the rod, a ratchet-wheel for retaining the rod in a raised position, a shaft carrying the ratchet-wheel, a spring for the shaft, a fast disk and a loose disk on the shaft connected with each other, a loose gear on the shaft connected with the loose disk, a rack-bar engaging the loose gear, a piston operated by the pressure of steam in the cooking vessel for raising the rack-bar, a set hand moved by the shaft or arbor, and a scale coacting with the set hand, substantially as described.

14. In an automatic steam-cooker and in combination with a valve mechanism having a regulating-section, a rod, a slidable and oscillating plate having the rod connected therewith, a revoluble plate in correlation with the oscillating plate, a pawl on the revoluble plate, and a pin on the oscillating plate engaged by the pawl for raising the oscillating plate to raise the rod and close the regulating-section of the valve, substantially as described.

15. In an automatic steam-cooker and in combination with a valve mechanism having a regulating-section, a rod, a slidable and oscillating plate having the rod connected therewith and heavier on one side than on the other, a revoluble plate in correlation with the oscillating plate, a pawl on the revoluble plate, a pin on the oscillating plate engaged by the pawl for raising the oscillating plate to raise the rod and close the regulating-section of the valve, substantially as described.

16. In an automatic steam-cooker and in combination with a valve mechanism having a regulating-section, a rod, a slidable and oscillating plate having the rod connected therewith and heavier on one side than on the other, a revoluble plate in correlation with the oscillating plate, a pawl on the revoluble plate, a pin on the oscillating plate engaged by the pawl for raising the oscillating plate to raise the rod and close the regulating-section of the valve, and a counterbalance-weight connected with the rod, substantially as described.

17. In an automatic steam-cooker and in combination with a valve mechanism having a regulating-section, a rod, a slidable and oscillating plate having the rod connected therewith, a revoluble plate in correlation with the oscillating plate, a pawl on the revoluble plate, a pin on the oscillating plate engaged by the pawl for raising the oscillating disk or plate to raise the rod and close the regulating-section of the valve, a notch in the periphery of the oscillating plate, and a drop-latch engaging the notch at the limit of the upward movement of the oscillating plate, substantially as described.

18. In an automatic steam-cooker and in combination with a valve mechanism having a regulating-section, a rod, a slidable and oscillating plate having the rod connected therewith, a revoluble plate in correlation with the oscillating plate, a pawl on the revoluble plate, a pin on the oscillating plate engaged by the pawl for raising the oscillating plate to raise the rod and close the regulating-section of the valve, a center or hub on the revoluble plate having a recess in one side, and a guide-pin projecting from the oscillating plate for holding the plates in center during the forward movement of the oscillating plate, substantially as described.

19. In an automatic steam-cooker and in combination with a valve mechanism having a regulating-section, a rod, a slidable and oscillating plate having the rod connected therewith, a revoluble plate in correlation with the oscillating plate, a pawl on the revoluble plate, a pin on the oscillating plate engaged by the pawl for raising the oscillating plate to raise the rod and close the regulating-section of the valve, a train of gear for turning the revoluble plate, and a rack-bar raised by the pressure of steam in the cooking vessel to cause the train of gear to operate the revoluble plate, substantially as described.

20. In an automatic steam-cooker and in combination with a valve mechanism having a regulating-section, a rod, a slidable and oscillating plate having the rod connected therewith, a revoluble plate in correlation with the oscillating plate, a pawl on the revoluble plate, a pin on the oscillating plate engaged by the pawl for raising the oscillating plate to raise the rod and close the regulating-section of the valve, a train of gear for turning the revoluble plate, a rack-bar connected with the train of gear, and a piston actuated by the pressure in the cooking vessel to raise the rack-bar and operate the train of gear and the revoluble plate, substantially as described.

21. In an automatic steam-cooker and in combination with a valve mechanism having a regulating-section, a rod, a slidable and oscillating plate having the rod connected therewith, a revoluble plate in correlation with the oscillating plate, a pawl on the revoluble plate, a pin on the oscillating disk or plate engaged by the pawl for raising the oscillating plate to raise the rod and close the regulating-section of the valve, and a weight on the revoluble plate for counterbalancing the pawl, substantially as described.

22. In an automatic steam-cooker and in combination with a valve mechanism having a regulating-section, a rod, a slidable and oscillating plate having the rod connected therewith, a revoluble plate in correlation with the oscillating plate, a pawl on the revoluble plate, a pin on the oscillating plate engaged by the pawl for raising the oscillating plate to raise the rod and close the regulating-section of the valve, a train of gear and a reciprocating rack-bar for oscillating the revoluble plate and a balance-wheel for the revoluble plate for the stem of the revoluble plate, substantially as described.

23. In an automatic steam-cooker and in combination with a valve mechanism having a regulating-section, a rod, a slidable and oscillating plate having the rod connected therewith, a revoluble plate in correlation with the oscillating plate, a pawl on the revoluble plate, a pin on the oscillating plate engaged by the pawl for raising the oscillating plate to raise the rod and close the regulating-section of the valve, a train of gear, a reciprocating rack-bar for oscillating the revoluble plate, a hand coacting with the plates, and a reciprocating rack-bar for moving the time-hand coincidingly with the movements of the plates, substantially as described.

24. In an automatic steam-cooker and in combination with a valve mechanism having a shut-off section and a regulating-section, a rod for each section of the valve mechanism, a mechanism controlling the movement of the rod for the shut-off section of the valve, a mechanism controlling the movement of the rod for the regulating-section of the valve, a set-hand coöperating with the shut-off mechanism of the valve, a hand coöperating with the regulating mechanism of the valve, and means for operating the mechanisms and the hands by the pressure of the steam in the cooking vessel, substantially as described.

25. In an automatic steam-cooker, and in combination with a valve mechanism having a shut-off section and a regulating-section, a rod for each section of the valve mechanism, mechanism for operating the rod of the shut-off section of the valve, a set-hand coacting with the shut-off mechanism of the valve, a reciprocating rack-bar connected with the shut-off mechanism and the set-hand, and a piston for operating the rack-bar through the pressure of the steam in the cooking vessel, substantially as described.

26. In an automatic steam-cooker, the combination of a valve mechanism having a shut-off section and a regulating-section, a rod for each section of the valve mechanism, a mechanism for operating the rod of the regulating-section of the valve, a hand coacting with the regulating mechanism, reciprocating rack-bars one for operating the regulating mechanism and one for operating the hand, and a piston to operate the rack-bars through the pressure of the steam in the cooking vessel, substantially as described.

27. In a steam-cooker, the combination of a valve mechanism having a shut-off section and a regulating-section, mechanism for operating the shut-off section of the valve, mechanism for operating the regulating-section of the valve, a set-hand in direct action with the shut-off mechanism, a hand operating in conjunction with the regulating mechanism, for the alinement of both hands to cause the mechanism to operate and close the valve, substantially as described.

28. The combination with a steam cooking vessel, of a fluid-fuel burner and means for controlling the supply of fuel to said burner, said means comprising a valve adapted to alternately decrease and increase the supply of fuel to said burner as the steam-pressure in the vessel increases and means to cut off completely the supply of fuel to said burner when the steam-pressure in the vessel has reached a predetermined maximum, substantially as described.

WILLIAM F. HERDRICH.

Witnesses:
 THOMAS A. BANNING,
 OSCAR W. BOND.